United States Patent
Krause et al.

(10) Patent No.: US 10,443,680 B2
(45) Date of Patent: Oct. 15, 2019

(54) CENTRIFUGAL PENDULUM DEVICE AND TORSIONAL VIBRATION DAMPER

(71) Applicant: Schaeffler Technologies AG & Co. KG, Herzogenaurach (DE)

(72) Inventors: Thorsten Krause, Buehl (DE); Christian Huegel, Rheinau (DE); Stephan Maienschein, Baden-Baden (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 173 days.

(21) Appl. No.: 15/128,834

(22) PCT Filed: Mar. 19, 2015

(86) PCT No.: PCT/DE2015/200181
§ 371 (c)(1),
(2) Date: Sep. 23, 2016

(87) PCT Pub. No.: WO2015/149794
PCT Pub. Date: Oct. 8, 2015

(65) Prior Publication Data
US 2017/0102045 A1   Apr. 13, 2017

(30) Foreign Application Priority Data

Apr. 2, 2014 (DE) .......... 10 2014 206 264
Jul. 2, 2014 (DE) .......... 10 2014 212 855

(51) Int. Cl.
*F16F 15/14* (2006.01)

(52) U.S. Cl.
CPC .................. *F16F 15/145* (2013.01)

(58) Field of Classification Search
CPC ............... F16F 15/145; F16F 15/1457; F16F 15/14701; Y10T 74/2128
See application file for complete search history.

(56) References Cited

U.S. PATENT DOCUMENTS

| 2,343,421 A * | 3/1944 | Porter ............ F16F 15/14 74/574.3 |
| 2009/0188463 A1* | 7/2009 | Wright ............ F16F 15/145 123/192.2 |

(Continued)

FOREIGN PATENT DOCUMENTS

| DE | 10224874 A1 * | 12/2002 | ........ F16F 15/13128 |
| DE | 102011010342 A1 | 8/2011 | |

(Continued)

OTHER PUBLICATIONS

EPO Translation of DE 10224874 A1, Jackel et al., Dec. 19, 2002. (Year: 2018).*

(Continued)

*Primary Examiner* — Daniel D Yabut
(74) *Attorney, Agent, or Firm* — LeKeisha M. Suggs

(57) ABSTRACT

A centrifugal pendulum device which can be mounted in a rotatable manner about an axis of rotation, having a first pendulum mass unit, a first pendulum flange, and a second pendulum flange which is at least partially spaced apart from the first pendulum flange in an axial direction; the first pendulum mass unit is positioned axially between the first pendulum flange and the second pendulum flange, the first pendulum mass unit being coupled at least to the first and/or second pendulum flange so that it is movable to a limited extent; at least one third pendulum flange and a second pendulum mass unit are provided, the second pendulum mass unit being coupled at least to the third pendulum flange so that it is movable to a limited extent.

10 Claims, 4 Drawing Sheets

(56) References Cited

U.S. PATENT DOCUMENTS

2013/0283967 A1 * 10/2013 Movlazada .......... F16F 15/145
                                                                  74/574.2
2014/0113733 A1    4/2014  Verhoog et al.
2015/0101450 A1    4/2015  Kuehnle et al.

FOREIGN PATENT DOCUMENTS

| DE | 102012219959 A1 | 5/2013 | | |
|---|---|---|---|---|
| EP | 2853770 A1 | 4/2015 | | |
| WO | 2012168604 A1 | 12/2012 | | |
| WO | WO-2014005907 A1 * | 1/2014 | ............ | F16F 15/145 |

OTHER PUBLICATIONS

EPO Translation of WO 2014/0058907 A1, Hoffmann et al., Jan. 9, 2014. (Year: 2019).*

* cited by examiner

CENTRIFUGAL PENDULUM DEVICE AND TORSIONAL VIBRATION DAMPER

CROSS-REFERENCE TO RELATED APPLICATIONS

The present application is the United States National Stage application pursuant to 35 U.S.C. § 371 of International Patent Application No. PCT/DE2015/200181, filed Mar. 19, 2015, and claims priority to German Patent Application No. 10 2014 206 264.0, filed Apr. 2, 2014 and German Patent Application No. 10 2014 212 855.2, filed Jul. 2, 2014, which applications are incorporated by reference in their entireties.

FIELD

The invention relates to a centrifugal pendulum device and a torsional vibration damper.

BACKGROUND

Centrifugal pendulum devices that have a pendulum mass unit and a pendulum flange are known. The pendulum mass unit is coupled to the pendulum flange so that it is movable to a limited extent.

SUMMARY

According to aspects illustrated herein, there is a provided a centrifugal pendulum device that is mountable rotatably around an axis of rotation, having a first pendulum mass unit, a first pendulum flange and a second pendulum flange that is at least partially set apart axially from the first pendulum flange, wherein the second pendulum mass unit is positioned axially between the first pendulum flange and the second pendulum flange. The first pendulum mass unit is coupled at least to the first and/or second pendulum flange so that it is movable to a limited extent. At least one third pendulum flange and a second pendulum mass unit are provided. The second pendulum mass unit is coupled at least to the third pendulum flange so that it is movable to a limited extent.

The object of the invention is to provide an improved centrifugal pendulum device and an improved torsional vibration damper having such a centrifugal pendulum.

This object is fulfilled by means of a centrifugal pendulum device as claimed.

According to the invention, it was recognized that an improved centrifugal pendulum device can be provided by the centrifugal pendulum device being mountable rotatably about an axis of rotation, where the centrifugal pendulum device has a first pendulum mass unit, a first pendulum flange and at least one second pendulum flange which is at least partially distanced from the first pendulum flange in an axial direction. Positioned axially between the first pendulum flange and the second pendulum flange is the first pendulum mass unit. The first pendulum mass unit is coupled at least to the first and/or second pendulum flange so that it is movable to a limited extent. Furthermore, at least one third pendulum flange and a second pendulum mass unit are provided. The second pendulum mass unit is coupled at least to the third pendulum flange so that it is movable to a limited extent.

This enables an especially great absorber effect to be achieved by the centrifugal pendulum device with small construction space dimensions.

In another embodiment, the third pendulum flange is distanced axially from the first and/or second pendulum flange. The second pendulum mass unit is positioned at least partially axially between the third pendulum flange and the second pendulum flange. This enables the construction space to be optimized in the radial direction.

In another embodiment, the first pendulum mass unit is coupled by means of a first slotted guide to the first and/or second pendulum flange. The second pendulum mass unit is coupled by means of a second slotted guide to the second and/or third pendulum flange. The first slotted guide is offset from the second slotted guide in the circumferential direction and/or in the radial direction. This enables the centrifugal pendulum device to be designed especially compactly in the axial direction.

In another embodiment, the first slotted guide is designed to guide the first pendulum mass unit along a first oscillation path. The second slotted guide is designed to guide the second pendulum mass unit along a second oscillation path. The first oscillation path is different from the second oscillation path. The first oscillation path is preferably tuned to a first damping order and the second oscillation path to a second damping order, the two damping orders preferably being different.

In another embodiment, the first pendulum mass unit is designed differently from the second pendulum mass unit, the first pendulum mass unit preferably having a first damping order and the second pendulum mass unit having a second damping order which differs from the first damping order. Alternatively, the first pendulum mass unit has a first damping order and the second pendulum mass unit has a second damping order which is identical to the first damping order.

In another embodiment, at least one of the pendulum mass units includes a first pendulum mass and at least one second pendulum mass, the two pendulum masses being positioned adjacent to each other in a circumferential direction, while preferably a first coupling means is provided, the first pendulum mass and the second pendulum mass preferably being operatively connected to each other by the first coupling means. It is thereby possible in a simple way to prevent the two pendulum masses from colliding with one another, so that the centrifugal pendulum device operates with especially little noise.

In another embodiment, a second coupling means is provided, the second coupling means being operatively connected to the first pendulum mass unit and the second pendulum mass unit. In this way, the two pendulum mass units may be excited jointly to vibration, and a damping order of the two pendulum mass units may be modified in a simple way.

In another embodiment, the first and/or second coupling means includes at least one spring element, in particular, a coil spring. It is especially advantageous for operation of the centrifugal pendulum device in a reciprocating engine with cylinder deactivation if the first pendulum mass unit and the second pendulum mass unit are designed for different damping orders.

Especially large rotational non-uniformities can be canceled out thereby if a fourth pendulum flange that is at least partially spaced apart axially from the third pendulum flange is provided. In at least some cases, a third pendulum mass unit is provided axially between the third pendulum flange and the fourth pendulum flange. The third pendulum mass unit is coupled to the third pendulum flange or fourth pendulum flange so that it is movable to a limited extent. The cascaded arrangement of pendulum mass units and the coupling with the pendulum flanges makes it possible to reduce the radial construction space and to make use of the construction space in the axial direction. Furthermore, reliable support of the pendulum mass units on the pendulum flanges is assured.

In another embodiment, the first and second pendulum masses are positioned at the same or different diameters relative to the axis of rotation.

In another embodiment, the pendulum flanges are connected to each non-rotatingly, so that a rotational non-uniformity can be introduced by means of the first pendulum flange via connecting means into the other pendulum flanges, so as to excite the relevant pendulum mass units coupled with the pendulum flange to oscillation along the oscillation path, and thus to cancel the rotational deformity.

But the object is also fulfilled by a torsional vibration damper according to the claims.

The torsional vibration damper includes at least one centrifugal pendulum device that is designed as described above.

BRIEF DESCRIPTION OF THE SEVERAL VIEWS OF THE DRAWINGS

The invention will be explained in greater detail below on the basis of figures. The figures show the following.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

Figure 1:
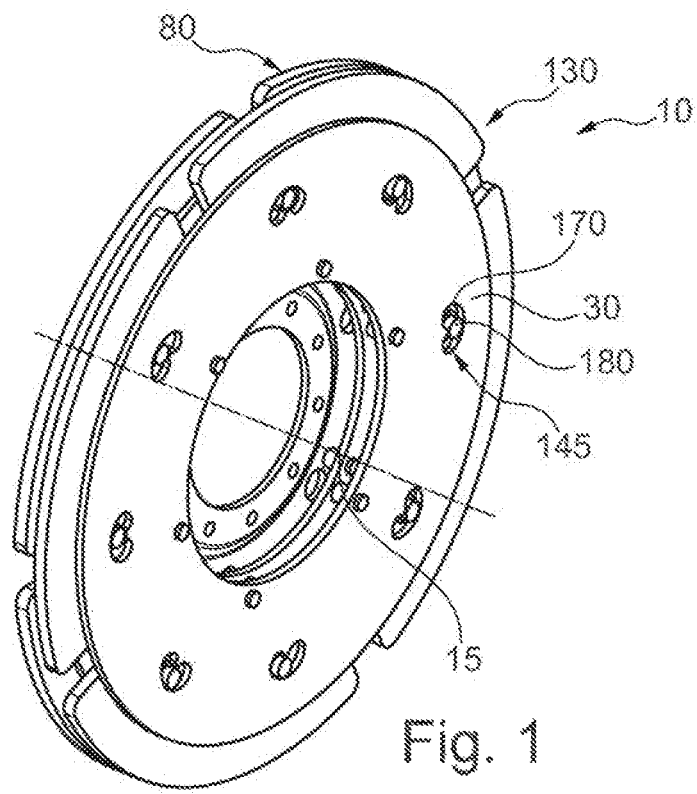
FIG. 1 is a perspective view of a centrifugal pendulum device.
Figure 2:
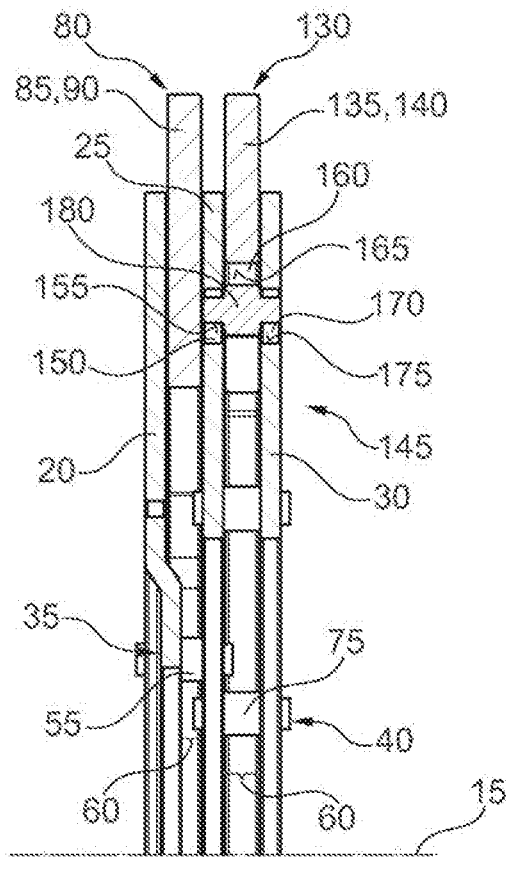
FIG. 2 is a semi-longitudinal sectional view through the centrifugal pendulum device shown in FIG. 1.
Figure 3:
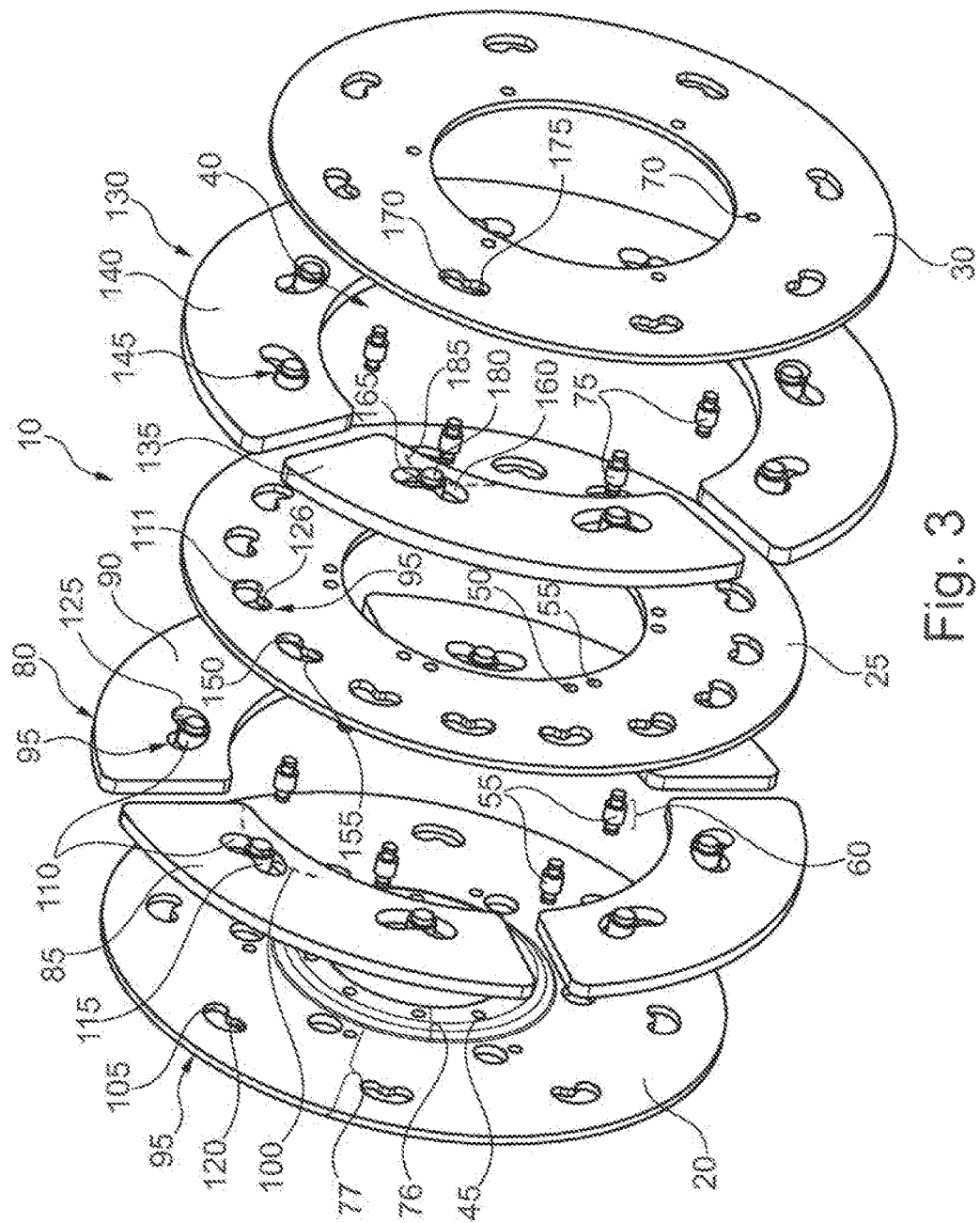
FIG. 3 is an exploded view of the centrifugal pendulum device shown in FIGS. 1 and 2.

FIG. 1 shows a perspective view of a centrifugal pendulum device 10. FIG. 2 shows a semi-longitudinal section through the centrifugal pendulum device 10 shown in FIG. 1. FIG. 3 shows an exploded view of the centrifugal pendulum device 10 shown in FIGS. 1 and 2. FIGS. 1 through 3 will be explained together below.

The centrifugal pendulum device 10 is part of a torsional vibration damper, the centrifugal pendulum being mounted rotatably about an axis of rotation 15. The centrifugal pendulum device 10 includes a first pendulum flange 20, a second pendulum flange 25 and a third pendulum flange 30. The pendulum flanges 20, 25, 30 may also be referred to as pendulum mass carriers 20, 25, 30, however. The first pendulum flange 20 is distanced axially from the second pendulum flange 25 and the second pendulum flange 25 is distanced axially from the third pendulum flange 30. The first pendulum flange 20 is connected to the second pendulum flange 25 by a first connecting means 35. Furthermore, the second pendulum flange 25 is connected to the third pendulum flange 30 by a second connecting means 40.

The first connecting means 35 (see FIG. 3) includes a plurality of first openings 45 positioned in the first pendulum flange 20, distributed in the circumferential direction for example at uniform intervals. Furthermore, in the second pendulum flange 25 second openings 50 are provided, positioned opposite the first openings 45 in the axial direction. A connecting pin 55 of the first connecting means 35 extends through each of the first openings 45 and second openings 50. The connecting pin 55 is riveted at its relevant longitudinal end to the first pendulum flange 20 or to the second pendulum flange 25. To set the distance between the two pendulum flanges 20, 25 at a defined value, the connecting pin 55 has a thickened section 60 in the middle which has a larger diameter than the first openings 45 and the second openings 50.

The second connecting means 40 is designed analogously to the first connecting means 35. The second connecting means 40 has third openings 65 arranged in the second pendulum flange 25, which are provided adjacent in the circumferential direction and at the same diameter relative to the second openings 50 in the second pendulum flange 25. In the third pendulum flange 30, the second connecting means has fourth openings 70 positioned opposite the third openings 65. A second connecting pin 75 extends through the third and fourth openings 65, 70. The second connecting pin 75 corresponds in design to the first connecting pin 55 in this embodiment. Alternatively, it is also conceivable for the second connecting pin 75 to have a different form and to be designed longer or shorter, for example, in the axial direction, than the first connecting pin 55.

In this embodiment, the connecting pin 55, 75 is circular-shaped. It is of course also conceivable for the connecting pin 55, 75 to have a different cross-section. It is also conceivable for the connecting pin 55, 75 to have the form of a clinch bolt, so that the pendulum flanges 20, 25, 30, if they should at least partially fit closely together axially, can be connected to one another. In this case, in particular the thickened section 60 for spacing the respective pendulum flanges 20, 25, 30 apart is dispensed with.

In this embodiment, the second and third pendulum flanges 20, 25, 30 are essentially disk-shaped, with a flat form in the radial direction. It is of course also conceivable for the pendulum flanges 20, 25, 30, like the first pendulum flange 20, to have a first section 76, and a second section 77 bordering radially on the first section 76, the first section 76 being offset from the second section 77 in the radial direction. The first section 76 can serve to connect the centrifugal pendulum device 10 torsionally with other components of a torque transmitting device, in particular with other components of a torsional vibration device.

A first pendulum mass unit 80 is provided axially between the first pendulum flange 20 and the second pendulum flange 25. The first pendulum mass unit 80 includes a first pendulum mass 85 and a second pendulum mass 90. The first pendulum mass 85 is positioned adjacent to the second pendulum mass 90 in the circumferential direction. The first pendulum mass 85, like the second pendulum mass 90, is in the form of a partial ring. The first pendulum mass unit 80 is coupled by means of a first slotted guide 95 to the first pendulum flange 20, but also to the second pendulum flange 25, so that it is movable to a limited extent. The coupling serves to guide the first pendulum mass unit 80 along a first oscillation path 100 when rotational non-uniformities are introduced into the centrifugal pendulum device 10.

To this end, the first slotted guide 95 has at least one first cutout 105 situated in the first pendulum flange 20. The first cutout 105 is kidney-shaped, and has a center of curvature which is located radially inward of the first cutout 105. In the first and second pendulum masses 85, 90, the slotted guide 95 has in each case, for example, kidney-shaped second cutouts 110. The second cutouts 110 have a center of curvature which is located radially outward of the second cutout 110. Furthermore, the slotted guide includes a third cutout 111 located in the second pendulum flange 25. The third cutout is positioned axially opposite the first cutout 105, and is identical in form to the first cutout 105. A roller 115 reaches through the cutouts 105, 110, 111 in the axial direction. The cutouts 105, 110 111 each have a cutout contour 120, 125, 126; the first oscillation path 100 is defined by contact of a circumferential surface of the first roller 115 on the relevant cutout contour 120, 125, 126.

The centrifugal pendulum device 10 also has a second pendulum mass unit 130. The second pendulum mass unit 130 is positioned at least partially axially between the second pendulum flange 25 and the third pendulum flange 30. In this embodiment, the second pendulum mass unit 130 is identical in design to the first pendulum mass unit 80. It is of course also conceivable for the second pendulum mass unit 135 to be different from the first pendulum mass unit 80.

The second pendulum mass unit 130 has a third pendulum mass 135 and a fourth pendulum mass 140. The fourth pendulum mass 140 is positioned adjacent to the third pendulum mass 135 on the circumference. The third and fourth pendulum masses 135, 140 are in the form of partial rings.

The second pendulum mass unit 130 is coupled by means of a second slotted guide 145 to the second and the third pendulum flanges 25, 30. It is of course also conceivable for the second pendulum mass unit 130 to be coupled exclusively to the third pendulum flange 30 or exclusively to the second pendulum flange 25 by means of the second slotted guide 145 so that it is movable to a limited extent.

In this embodiment, the second slotted guide 145 is identical in design to the first slotted guide 95. Differing therefrom however, in this embodiment the second slotted guide 145 is offset from the first slotted guide 95 in the circumferential direction. It would of course also be conceivable for the second slotted guide additionally or alternatively to be offset from the first slotted guide 95 in the radial direction.

The second slotted guide 145 has in the second pendulum flange 25 a fourth cutout 150 with a fourth cutout contour 155. In each of the third and fourth pendulum masses 135, 140, the second slotted guide has a fifth cutout 160 with a fifth cutout contour 165. In the third pendulum flange 30, the second slotted guide 145 has a sixth cutout 170 with a sixth cutout contour 175. The fourth cutout 150 and the sixth cutout 170 are kidney-shaped, and have a center of curvature which is located radially inward of the fourth and sixth cutouts 150, 170. The fifth cutout 160 is likewise kidney-shaped, and has a center of curvature which is located radially outward of the fifth cutout 160.

In order to guide the third and fourth pendulum masses 135, 140 reliably in the radial direction along the oscillation path 185, two fifth cutouts 160 are provided in each of the third and fourth pendulum masses 135, 140. It is of course also conceivable for a different number of fifth cutouts 160 to be provided in the third and the fourth pendulum masses 135, 140.

A second roller 180 of the second slotted guide, which is identical in this embodiment to the first roller 115, extends through the fourth, fifth and sixth cutouts 150, 160, 170.

If the centrifugal pendulum is rotating, then the circumferential surface of the roller 180 is in contact with the fourth, fifth and sixth cutout contours 155, 165, 175 and defines a second oscillation path 185. In this embodiment, the second oscillation path 185 may be, for example, identical to the first oscillation path 100. It is of course also conceivable for the second oscillation path 185 to differ in form from the first oscillation path 100. If a rotational non-uniformity is introduced into the pendulum flange 20, 25, 30, the pendulum mass units 80, 130 are excited to oscillate along their oscillation path 100, 185, and in so doing function as energy storage elements.

The axial construction of the centrifugal pendulum device 10 can be kept especially small by the arrangement of the third and fourth cutouts 111, 150 in the second pendulum flange 25. It is especially advantageous here if the first pendulum mass unit 80 is offset in the circumferential direction relative to the second pendulum mass unit 130, so that in the second pendulum flange 25 as a result the third cutout 111 alternates with the fourth cutout 150 in the circumferential direction.

The centrifugal pendulum device 10 is particularly well suited for vehicles that have a reciprocating engine which has cylinder deactivation. The number of cylinders that are in operation with cylinder deactivation is usually cut in half. So, for example, in an eight-cylinder engine that has two cylinder banks, one of the two cylinder banks is shut off, so that during operation with cylinder shut off four cylinders are supplied with fuel, while the other four cylinders run along without being supplied with fuel. The same also applies, for example, to reciprocating engines having six cylinders, in which three cylinders are then shut off and the reciprocating engine is operated in cylinder deactivation mode with three cylinders. This can also be carried over to a different number of cylinders with reciprocating engines; for example, in a four-cylinder engine two cylinders are shut off and two cylinders are provided with fuel in cylinder deactivation mode.

Reciprocating engines having cylinder deactivation have two main exciter orders in these cases. The main exciter order is dependent on the number of cylinders in operation. The main exciter order is usually the order that corresponds to half of the number of cylinders. So the main exciter order of an eight-cylinder engine operating without cylinder deactivation is four, while on the other hand the main exciter order of an eight-cylinder engine with four cylinders shut off is two.

When operating with cylinder deactivation, the reciprocating engine runs less roundly; that is, rotational non-uniformities in the torque provided by the reciprocating engine have a greater amplitude than in operation without cylinder deactivation. The large rotational non-uniformities introduced into the drivetrain can bring conventional centrifugal pendulum devices to the limits of their vibration isolation, in that the pendulum mass units there hit the end of the oscillation path. This results in noise emission.

In this embodiment, the first pendulum mass unit 80 has its first slotted guide 95 matched to a first main exciter order of the reciprocating engine, for example, when operating the reciprocating engine without cylinder deactivation. Matching means adjusting a first damping order of the first pendulum mass unit 80 to the first main exciter order of the reciprocating engine, in order to achieve the best possible damping of the first main exciter order.

The second pendulum mass unit 130 has its second slotted guide 145 matched to a second main exciter order of the reciprocating engine, for example, when operating the reciprocating engine with cylinder deactivation. This means that the second damping order of the second pendulum mass unit 130 corresponds to the second major exciter order.

In this embodiment, the first pendulum mass 85 and the second pendulum mass 90 are guided along the first oscillation path, so that the first pendulum mass 85 and the second pendulum mass 90 have the same damping order. The same applies to the third pendulum mass 135 and fourth pendulum mass 140. The third pendulum mass 135 and the fourth pendulum mass 140 are designed identically to each other and are guided along the second oscillation path 185, so that the third pendulum mass 135 and the fourth pendulum mass 140 have the second damping order. The variation in the damping orders of the centrifugal pendulum device 10 can be achieved, for example, by the fact that a mass of the pendulum masses 85, 90, 135, 140 is identical from one to the other, but the oscillation path 100, 185 is shaped differently. It is also conceivable that while the oscillation paths 100, 185 of the two pendulum mass units 80, 130 are identical, a mass of the first pendulum mass 85 and/or of the second pendulum mass 90 differs from a mass of the third pendulum mass 135 and/or the fourth pendulum mass 140. A combination of the forenamed is also conceivable, in order to match the respective damping orders of the pendulum mass units 80, 130 each to a main exciter order that differs from the other main exciter order.

It is of course also conceivable for the first damping order to be identical to the second damping order. It is advantageous here if the first pendulum mass unit 80 is matched to the first damping order and the second pendulum mass unit 130 is matched to the second damping order.

It is also conceivable for one of the pendulum masses 85, 90, 135, 140 within the pendulum mass unit 80, 130 to be matched to the first damping order and for the other pendulum mass 85, 90, 135, 140 to be matched to the second damping order, so that each of the pendulum mass units 80, 130 is matched to two different damping orders.

Figure 4:
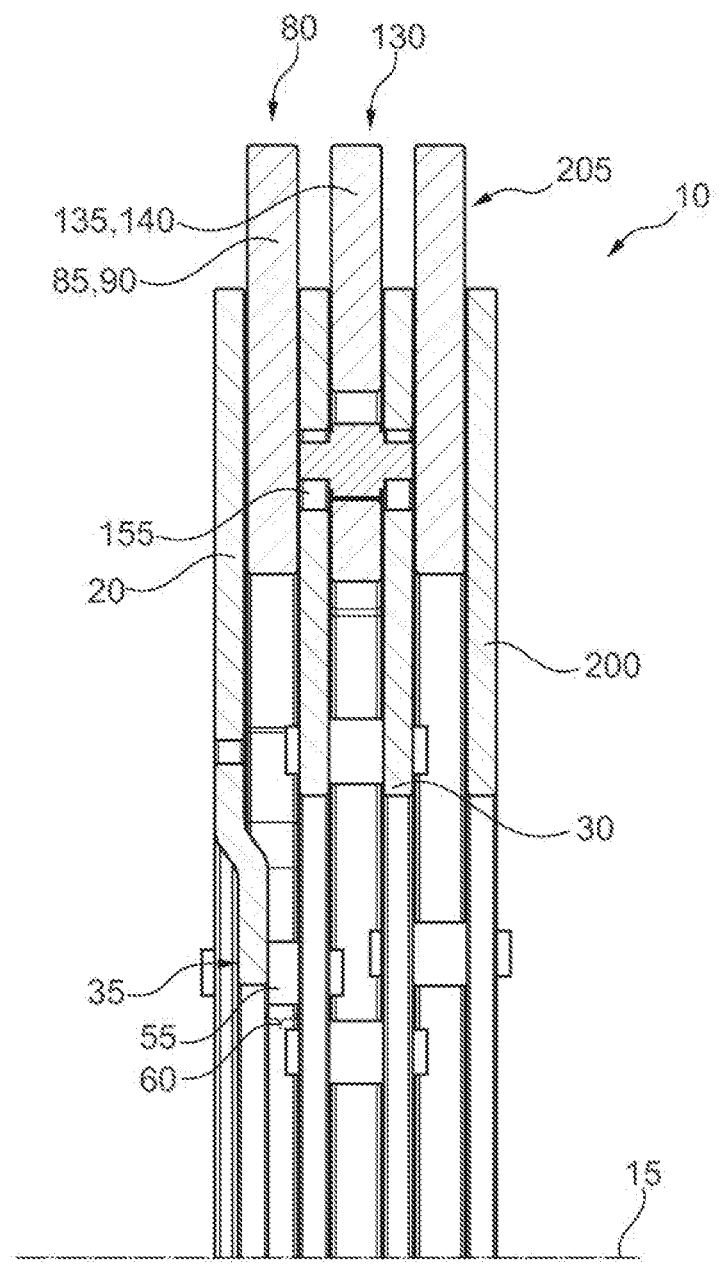
FIG. 4 is a semi-longitudinal sectional view through a refinement of the centrifugal pendulum device shown in FIG. 1.

FIG. 4 shows a modification of the centrifugal pendulum device 10 shown in FIGS. 1 through 3. The centrifugal pendulum device 10 is similar in construction to the centrifugal pendulum device 10 shown in FIGS. 1 through 3. In addition however, here a fourth pendulum flange 200 is provided, which is spaced apart axially from the third pendulum flange 30. Partially positioned axially between the third pendulum flange 30 and the fourth pendulum flange 200 is a third pendulum mass unit 205, which is coupled by means of a third slotted guide (not shown) to the fourth pendulum flange 200 and to the third pendulum flange 30 so that it is movable to a limited extent. In this embodiment, the third pendulum mass unit 205 and the third slotted guide are identical in design to the first pendulum mass unit 80 and the first slotted guide 95. It is particularly advantageous here if the first and the third pendulum mass units 80, 205 are matched to a first damping order to eliminate torsional vibrations of the first exciter order of the reciprocating engine when operating the reciprocating engine with cylinder deactivation. This enables especially strong torsional non-uniformities in the torque provided by the reciprocating engine to be eliminated.

Because of the cascaded arrangement of the pendulum mass units 80, 130, 205, the centrifugal pendulum device 10 can be matched especially easily to strong rotational non-uniformities in the torque provided by the reciprocating engine. In this case, the respective pendulum flanges 25, 30 situated between the pendulum mass units 80, 130, 205 assume guidance of the pendulum mass unit 80, 130, 205 situated on both sides of the respective pendulum flange 25, 30, so that in principle the number of pendulum flanges 80, 130, 205 is greater by 1 than the number of pendulum mass units 80, 130, 205 (n(pendulum flange 20, 25, 30, 200)=n (pendulum mass unit 80, 130, 205)+1).

Figure 5:
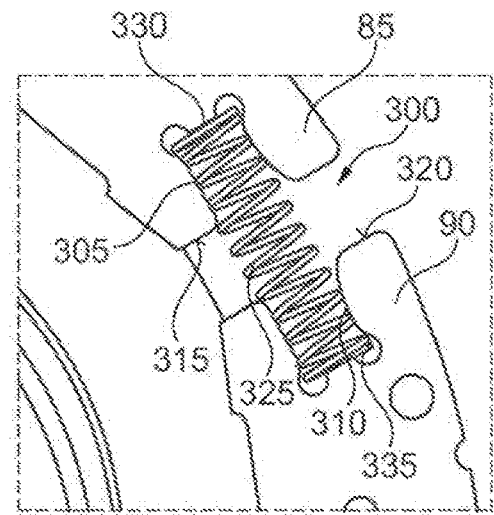
FIG. 5 is a detail of a cross-sectional view through a refinement of the centrifugal pendulum device shown in FIGS. 1 through 4 in a first operating state.
Figure 6:
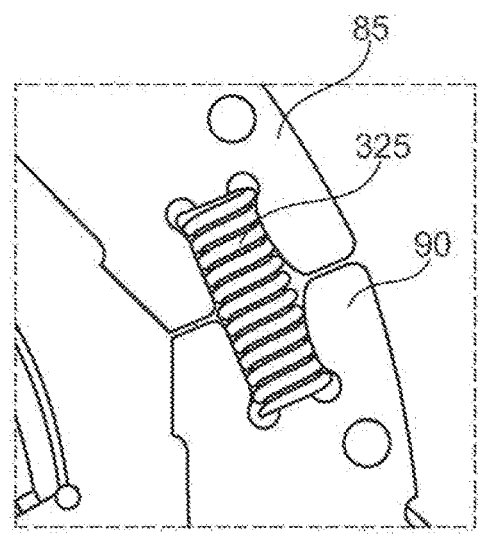
FIG. 6 is a detail of a cross-sectional view through a refinement of the centrifugal pendulum device shown in FIGS. 1 through 5 in a second operating state; and, FIG. 7 is a detail of a longitudinal sectional view through a further refinement of the centrifugal pendulum device shown in FIGS. 1 through 6.

FIG. 5 shows a cross-sectional view through a refinement of the embodiment of the centrifugal pendulum device 10 shown in FIGS. 1 through 3 in a first operating state, and FIG. 6 in a second operating state.

The first pendulum mass 85 is coupled to the second pendulum mass 90 by a coupling means 300. To this end, the coupling means 300 has a first holder 305 positioned in the first pendulum mass 85 and a second holder 310 positioned in the second pendulum mass 90. The two holders 305, 310 extend essentially in the circumferential direction and are positioned on lateral faces 315, 320 of the respective pendulum masses 85, 90 running in the radial direction.

The coupling means 300 also includes a spring element 325, which is designed as a coil spring in this embodiment. A first end 330 of the spring element 325 is positioned in the first holder 305 and a second longitudinal end 335 of the spring element 325 is positioned in the second holder 310. The spring element 325 couples the two pendulum masses 85, 90 together. If the two pendulum masses 85, 90 are excited by a rotational non-uniformity in the torque to oscillate along the first oscillation path 100, then the spring element 325 couples the two pendulum masses 85, 90, so that the first damping order of the first pendulum mass unit 80 can be matched by the coupling means 300 in a simple manner.

Furthermore, the spring element 325 prevents the two pendulum masses 85, 90 from hitting the respective lateral faces 315, 320, since in the second operating state the spring element 325 is compressed, as shown in FIG. 6, and separates the two pendulum masses 85, 90 from one another.

The coupling means 300 can naturally also be used to couple the third pendulum mass 135 to the fourth pendulum mass 140.

Figure 7:
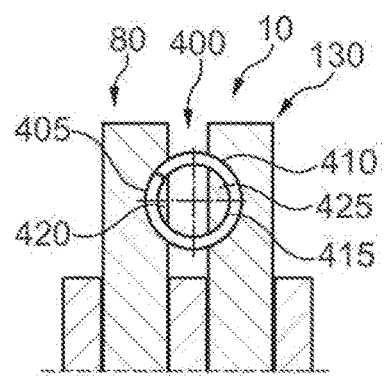

FIG. 7 shows a detail of a longitudinal section through a further refinement of the centrifugal pendulum device 10 shown in FIGS. 1 through 6. In addition to the first coupling means 300 shown in FIGS. 5 and 6, the centrifugal pendulum device 10 has a second coupling means 400. The second coupling means 400 includes a second spring element 415, which is designed as a coil spring. The first pendulum mass unit 80 has a first holder 405 on an end face facing the second pendulum mass unit 130. The second pendulum mass unit 130 has a second holder 410 on an end face facing the first pendulum mass unit 80.

A second spring element 415 is situated in the holder 410. The longitudinal ends of the spring element 415 are touching a lateral face 420, 425 of the holder 405, 410 which runs in the radial direction. If the first pendulum mass unit 80 is excited to oscillation along the first oscillation path 100 by a rotational non-uniformity, the second coupling means 400 transmits the oscillating motion to the second pendulum mass unit 130 and likewise excites the latter to oscillation along the second oscillation path 185. But the respective damping order of the first or second pendulum mass unit/device 80, 130 can also be matched in a simple manner by the second coupling means 400.

The first pendulum mass unit 80 and the second pendulum mass unit 130 are positioned in a circle and thus at the same diameter relative to the axis of rotation 15. It is of course also conceivable for the first pendulum mass unit 80 to be positioned on a different circle than the second pendulum mass unit 130 relative to the axis of rotation 15, each having a different diameter relative to the axis of rotation 15. It is also conceivable to dispense with one of the two coupling means 300, 400, or even with both coupling devices 300, 400.

Let it also be pointed out that the features shown in FIGS. 1 through 7 may be combined individually or together with the other features shown in FIGS. 1 through 7.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE LABELS 10 centrifugal pendulum device
15 axis of rotation
20 first pendulum flange/pendulum mass carrier
25 second pendulum flange/pendulum mass carrier
30 third pendulum flange/pendulum mass carrier
35 first connecting means
40 second connecting means
45 first opening
50 second opening
55 first connecting pin
60 thickened section
65 third opening
70 fourth opening
75 second connecting pin
76 first section
77 second section
80 first pendulum mass unit
85 first pendulum mass
90 second pendulum mass
95 first slotted guide
100 first oscillation path
105 first cutout
110 second cutout
111 third cutout
115 first roller
120 first cutout contour
125 second cutout contour
126 third cutout contour
130 second pendulum mass unit
135 third pendulum mass
140 fourth pendulum mass
145 second slotted guide
150 fourth cutout
155 fourth cutout contour
160 fifth cutout
165 fifth cutout contour
170 sixth cutout
175 sixth cutout contour
180 second roller
185 second oscillation path
200 fourth pendulum flange
205 third pendulum mass unit
300 first coupling means
305 first holder
310 second holder
315 first lateral face
320 second lateral face
325 spring element
330 first end
335 second end
400 second coupling means
405 first holder
410 second holder
415 second spring element
420 first lateral face of the first holder
425 second lateral face of the second holder

What is claimed is:

1. A centrifugal pendulum device, comprising:
a first pendulum flange comprised of a first section and a second section, wherein the first section is disposed radially inward of, and axially offset from, the second section;
a second pendulum flange axially spaced apart from the first pendulum flange;
a first pendulum mass unit disposed axially between the first and the second pendulum flanges, the first pendulum mass unit having a first mass positioned adjacent to a second mass, wherein:
an end of the first mass facing the second mass includes a first recess extending in a first circumferential direction;
an end of the second mass facing the first mass includes a second recess extending in a second circumferential direction opposite the first circumferential direction; and
a spring arranged to couple the first and the second masses includes a first end disposed in the first recess and a second end disposed in the second recess;
a third pendulum flange axially spaced apart from the first and the second pendulum flanges;
a second pendulum mass unit separate from the first pendulum mass unit and disposed axially between the second and the third pendulum flanges;
a first connection element received within openings defined in the first section of the first pendulum flange and the second pendulum flange fixing the first pendulum flange to the second pendulum flange, wherein the first connection element does not pass through or contact the first pendulum mass unit and is radially inward of the first pendulum mass unit; and
a second connection element separate and radially offset from the first connection element and received within openings defined in the second pendulum flange and the third pendulum flange fixing the second pendulum flange to the third pendulum flange, wherein the second connection element does not pass through or contact the second pendulum mass unit and is radially inward of the second pendulum mass unit.

2. The centrifugal pendulum device of claim 1, wherein:
the first pendulum mass unit is connected to the first and/or the second pendulum flange by a first slotted guide;

the second pendulum mass unit is connected to the second and/or the third pendulum flange by a second slotted guide; and, the first slotted guide is offset from the second slotted guide in a circumferential direction.

3. The centrifugal pendulum device of claim 2, wherein:

the first slotted guide is designed to guide the first pendulum mass unit along a first oscillation path;

the second slotted guide is designed to guide the second pendulum mass unit along a second oscillation path;

the first oscillation path is different from the second oscillation path; and, the first oscillation path is matched to a first damping order and the second oscillation path is matched to a second damping order.

4. The centrifugal pendulum device of claim 1, wherein:

the first pendulum mass unit has a first damping order and the second pendulum mass unit has a second damping order which differs from the first damping order.

5. The centrifugal pendulum device of claim 1, wherein:

the first pendulum mass unit has a first damping order and the second pendulum mass unit has a second damping order which is identical to the first damping order.

6. The centrifugal pendulum device of claim 1, wherein the spring is a coil spring.

7. The centrifugal pendulum device of claim 1, further comprising:

a fourth pendulum flange that is spaced apart axially from the third pendulum flange;

a third pendulum mass unit is positioned axially between the third pendulum flange and the fourth pendulum flange; and the third pendulum mass unit is coupled to the third pendulum flange and/or the fourth pendulum flange so that it is movable to a limited extent.

8. The centrifugal pendulum device of claim 1, wherein the first and second pendulum mass units are positioned at an equal or a different diameter relative to an axis of rotation.

9. A torsional vibration damper comprising the centrifugal pendulum device of claim 1.

10. The centrifugal pendulum device of claim 1, wherein the first connection element includes a thickened section in a middle portion thereof that has a larger diameter than the openings in the first and second pendulum flanges to set a distance between the first and the second pendulum flanges to a predefined value.

* * * * *